(12) United States Patent
Lambrechts (10) Patent No.: US 9,558,140 B2
(45) Date of Patent: Jan. 31, 2017

(54) METHOD FOR ADDRESSING THE PARTICIPANTS OF A BUS SYSTEM

(71) Applicant: MELEXIS TECHNOLOGIES N.V., Tessenderlo (BE)

(72) Inventor: Marc Lambrechts, Kessel-Lo (BE)

(73) Assignee: MELEXIS TECHNOLOGIES N.V., Tessenderlo (BE)

( * ) Notice: Subject to any disclaimer, the term of this patent is extended or adjusted under 35 U.S.C. 154(b) by 699 days.

(21) Appl. No.: 14/043,186

(22) Filed: Oct. 1, 2013

(65) Prior Publication Data

US 2014/0095749 A1    Apr. 3, 2014

(30) Foreign Application Priority Data

Oct. 2, 2012  (GB) .................................. 1217558.4

(51) Int. Cl.
*G06F 13/00* (2006.01)
*G06F 13/40* (2006.01)
*H04L 29/12* (2006.01)
*H04L 12/403* (2006.01)
*H04L 12/40* (2006.01)

(52) U.S. Cl.
CPC ......... *G06F 13/4063* (2013.01); *H04L 12/403* (2013.01); *H04L 61/2038* (2013.01); *H04L 2012/40234* (2013.01)

(58) Field of Classification Search
CPC ............... G06F 13/385; G06F 13/4072; H03F 2203/45136; H03F 2203/45138
USPC ................ 710/104–105, 110, 305–306, 100; 713/300–340
See application file for complete search history.

(56) References Cited

U.S. PATENT DOCUMENTS

| 6,397,280 | B1 | 5/2002 | Nitschke et al. |
| 7,091,876 | B2 | 8/2006 | Steger |
| 2005/0132109 | A1* | 6/2005 | Steger ................... H04L 12/403 710/104 |
| 2005/0271077 | A1* | 12/2005 | Hartzsch ................. G06F 13/36 370/451 |
| 2010/0121534 | A1* | 5/2010 | Tanaka .............. H04L 12/40039 701/45 |
| 2010/0185841 | A1 | 7/2010 | Monreal |

FOREIGN PATENT DOCUMENTS

DE    102010026431 A1    1/2012

OTHER PUBLICATIONS

Search Report from corresponding GB Application No. 1217558.4, Jan. 30, 2013.
European Search Report from corresponding European Application No. EP13187045.3, Feb. 19, 2016.

* cited by examiner

*Primary Examiner* — Tim T Vo
*Assistant Examiner* — Kim T. Huynh
(74) *Attorney, Agent, or Firm* — Workman Nydegger (57) ABSTRACT

A robust method for addressing each of the participants of a bus system comprising a control unit, and a bus and a plurality of addressable participants connected to the bus, comprising the steps of a) pre-selecting a first number of participants, b) selecting from the pre-selected participants a second number of participants, and c) assigning one or more addresses to them, and repeating the steps a) to c). The selection and pre-selection is based on current sources, specific threshold values, and measurement error. The bus system and addressable device (are also claimed.

17 Claims, 7 Drawing Sheets

METHOD FOR ADDRESSING THE PARTICIPANTS OF A BUS SYSTEM

FIELD OF THE INVENTION

The invention relates to the field of bus systems comprising a control unit, a bus connected to the control unit, and a plurality of addressable participants connected to the bus. More in particular, the invention relates to a method for addressing the participants of the bus system, to such a bus system, and to such a participant.

BACKGROUND OF THE INVENTION

For minimizing the wiring complexities, for example in vehicles, it is common practice to transmit control signals for driving actuator devices via a bus to which, besides a control unit, the drive units for the actuator devices of the individual participants are connected. Combined to form a bus system are, for example, the actuator devices of a vehicle air conditioner, the window lift or the front seats of a vehicle. To enable the control unit to selectively drive one or a plurality of actuators, addresses are assigned to said actuators.

In older systems the addresses have been assigned to the participants in that they have been stored by programming, assigned via daisy chain, plug or PIN coding, or by sequential connection of the participant and allocation of the addresses after connection of a participant.

While programming is relatively easy during the manufacture of a vehicle, this is more complicated when the overall participant, i.e. the combination of the actuator device plus the drive unit, is, for example, replaced in a repair shop. Further, with regard to the logistics it is necessary that defined placement sequences are adhered to, which involves service inconvenience and the supply of pre-programmed (pre-addressed) components, which runs counter to the "identical-part principle" used in the automotive industry. The plug coding involves high costs due to the mechanical expenditure, and with regard to the stored address or the pin coding the logistics is complex since in this case no longer identical parts are involved such that these parts are no longer easily interchangeable. In the case of a daisy chain it is possible to realize the self-addressing of the participants of a bus system via switches for serially separating the bus connections between the participants. The drawbacks encountered in this regard are in particular the electrical disconnection of the bus line via active components and the large space requirement for bus systems which comprise a lot of participants.

Automated address allocation methods for bus systems are known in the art. A first group of bus systems, as e.g. described in U.S. Pat. No. 6,397,280B1, uses a circuit breaker (switch) for decoupling part of the chain from the master (also called "control unit"). So, at start-up, the master only "sees" the first slave (also called "participant"), and assigns a first address. Then the first slave closes its switch, and the master "sees" the second slave, etc. In this way each slave on the bus can be allocated a unique address, starting from the slave closest to the master.

A second group of bus systems uses the principle of sensing currents. In such a bus system, addresses are sequentially assigned to each slave, starting from the slave most distant from the master.

Figure 1:
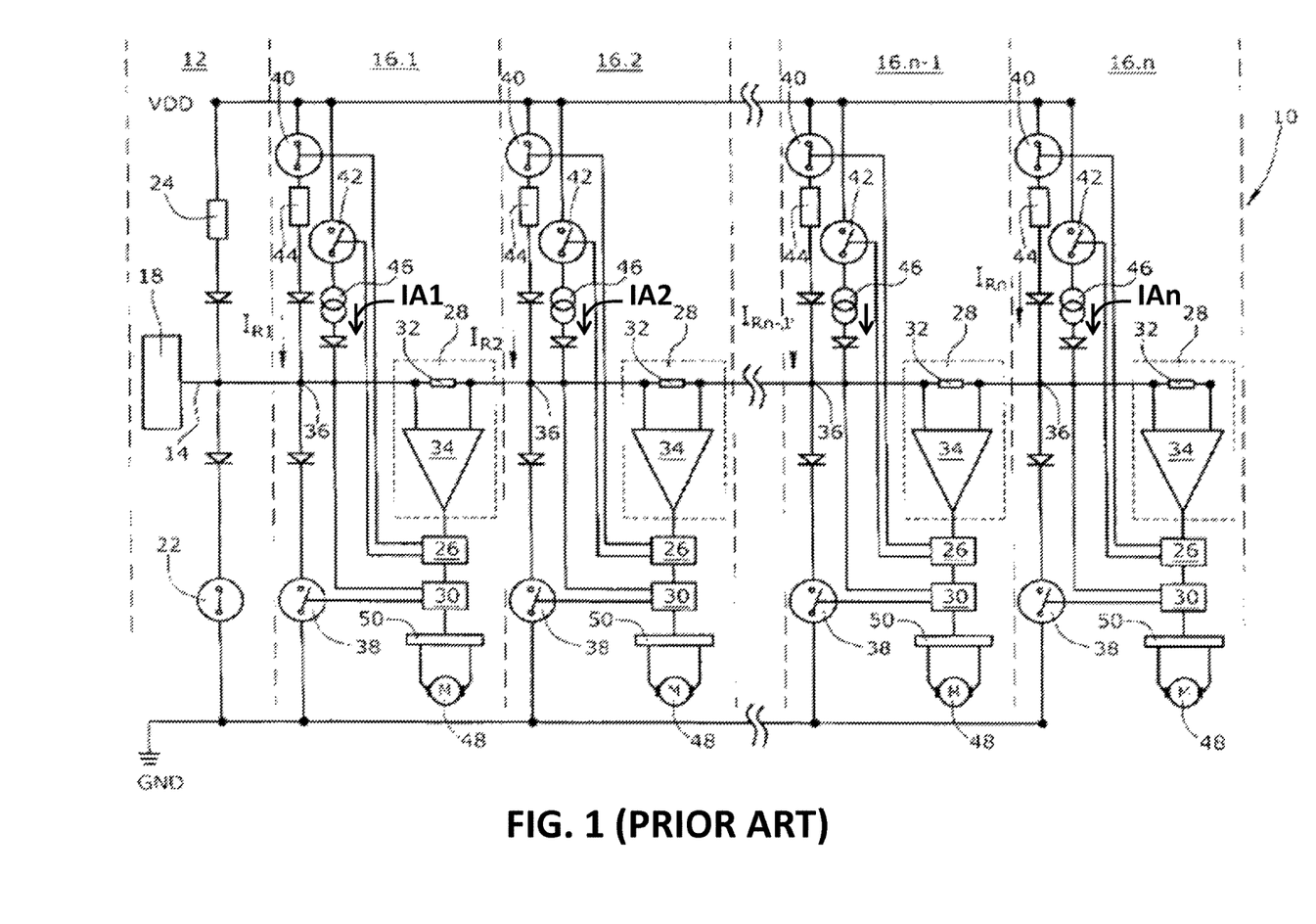
FIG. 1 shows a prior art bus system, where each addressable participant (=slave) has a pull-up resistor for feeding a quiescent current to the bus.

U.S. Pat. No. 7,091,876B2 describes such a bus system, (see also FIG. 1 of the present invention, which is a replica of FIG. 1 and FIG. 7 of U.S. Pat. No. 7,091,876B2). The functioning of this bus system will be described in detail here, in order to allow a good understanding of the present invention. FIG. 1 shows the setup of a serial bus system 10 (e.g. LIN-bus). The bus system 10 comprises a control unit 12 (master) to which a bus 14 is connected. Along the bus 14 a plurality of addressable participants (slaves) 16.1, 16.2, . . . , 16.n−1, 16.n (in general denoted 16.i below) are connected to said bus 14. All participants 16.i and the control unit 12 are connected to a supply voltage VDD and a ground voltage GND and can, at option, apply said potentials to the bus 14. The control unit 12 comprises a control circuit shown at 18 which applies control and addressing signals to the bus 14 and/or receives signals from the participants 16.i via the bus 14. The control circuit 18 drives a switch 22 with the aid of which the bus 14 is connectable via the control unit 12 with GND. Between VDD and the bus 14 a pull-up resistor 24 is located. All participants 16.i of the bus system 10 shown in FIG. 1 are equipped with an addressing logic 26 which is connected with a detector 28 and a control circuit 30. The control circuit 30 is connected with the bus 14, and the detector 28 measures, via a shunt resistor 32 located in the bus 14, the current flowing through the bus 14, in the area of the participant concerned, as a voltage drop which is amplified via an amplifier 34. Other variants of the detector 28 are also possible, provided that the detector 28 is in a position to measure the current flowing through the bus 14 in the area of the connecting node 36 of a participant 16.i. The control circuit 30 further controls a switch 38 in each participant 16.i, while the switches 40, 42 of each participant 16.i are controlled by the participant's addressing logic 26. The switch 38 connects, at option, the bus 14 with GND, while the switch 40 places the bus 14 via a pull-up resistor 44 to VDD, and the switch 42 connects the bus 14 with a current source 46 which feeds into the bus 14 an identifying current required for identifying a participant 16.i. Instead of a current source 46 a second pull-up resistor (not shown) may be arranged, provided that the VDD-potential is stable. In this embodiment the participants 16.i drive respective actuating members 48 assigned to the participants 16.i, said actuating members 48 being connected via an interface 50 with the control circuit 30 of the participant 16.i concerned. With the aid of the pull-up resistors and the switch 40 (in the closed state) the bus 14 is placed to VDD-potential in the area of each participant 16. When the switch 40 is closed, a quiescent current $I_R$, is fed into the bus 14. The connection of the bus 14 with VDD via the pull-up resistors 44 results, inter alia, in an interference-immunity of the bus 14, which is known for bus applications of the kind discussed here. For the sake of completeness it should be said that in all connecting lines of the control unit 12 and the participants 16.i comprising the aforementioned switches inverse-polarity protection diodes are provided which, however, like the switches 38 of the participants 16.i, are of no importance for the automatic addressing process described below. The initial situation for addressing the participants 16.i is shown in FIG. 1. The switch 22 of the control unit 12 and the switches 40 of the participants 16.i are closed, while the switches 38 of the participants 16.i remain open all the time. In this situation, the participants 16.i, which are designated in the drawing 16.1, 16.2, 16.n−1 and 16.n to allow better distinction between the participants (wherein n is the total of all participants), feed quiescent currents $I_{R1}$, . . . , $I_{Rn}$. It should be noted here that feeding of quiescent current during the addressing process is not absolutely necessary. If no quiescent current is fed, merely the switch 22 of the control unit 12 is closed at the beginning of the addressing process, while all other switches of the control unit 12 and the participants 16.*i* are open. When quiescent current is fed, currents of different magnitudes flow at the level of the different participants 16.*i* through the bus 14, said currents being detected with the aid of the detectors 28. The quiescent currents flow from the connecting nodes 36 of the participants 16.*i* to the control unit 12 where the quiescent currents flow off to GND. Due to arrangement of the detectors 28 behind the connecting nodes 36 (when looking at the bus 14 from the control unit 12), the detector 28 of the participant 16.*n* connected to the bus 14 at a location farthest away, as seen from the control unit 12, does not detect any quiescent current, the detector 28 of the participant 16.*n*−1 detects the quiescent current $I_{Rn}$, the detector 28 of the participant 16.2 detects a quiescent current which is equal to the sum of the quiescent currents $I_{R3}$ to $I_{Rn}$ of the participants 16.3 (not shown) to 16.*n*, and finally the detector 28 of the participant 16.1 detects a quiescent current which is equal to the sum of the quiescent currents $I_{R2}$ to $I_{Rn}$. The respective currents detected by the participants 16.1 to 16.*n* during this phase are stored in the addressing logic 26. After a defined period of time the participants 16 not addressed so far close their switches 42. As described above in conjunction with feeding of the quiescent currents, currents with different magnitudes occur after feeding of the addressing currents IA1 to IAn in the individual sections of the bus 14, which currents are detected by the detectors 28. Apart from the detector 28 of the last participant 16.*n*, all other participants 16.1 to 16.*n*−1 now detect a current on the bus 14, said current exceeding the value previously measured and stored in the addressing logic 26 by the magnitude of an identifying current (the identifying currents of all participants have the same magnitude). In other words: the participant 16.*n* is identifiable. If in the next step the control unit 12 applies an addressing signal to the bus 14, this signal is accepted only by the participant 16.*n* and placed into the addressing logic 26 of this participant. The participant 16.*n* addressed in this manner does not take part in the further addressing process. As already explained above, the addressing process does not require measurement of the quiescent current. Thus in the addressing logic 26 of the participants 16 no current values are stored when feeding of the identifying current begins. The participant to be addressed during the first addressing cycle can then be identified by its detector 28 not detecting any current flow despite the fact that an identifying current is being fed. When the current detection in each participant 16 is carried out before its connecting node 36 (when looking at the bus 14 from the control unit 12), identification of a participant to be identified in an addressing cycle is effected by the detector 28 of this participant detecting a current equal to the identifying current, while the other participants detect a current which is at least twice as large as the identifying current. In this manner, a participant can be identified. Above, the first addressing cycle of the automatic addressing process has been described for a case in which the control unit 12 applies, after identification of a participant, an addressing signal to the bus 14. Alternatively, it is also possible to apply the addressing signal to the bus prior to the identification, and to store said signal in the addressing logic 26 of all participants 16.*i*. In this case, only the identified participant accepts the previously received addressing signal as its own address, while this addressing signal is deleted in the addressing logics 26 of the other participants. After termination of the first addressing cycle the addressed participant 16.*n* does no longer take part in the further process, i.e. the switch 42 of the participant 16.*n* remains open. In the manner described above, the participant 16.*n*−1 can be identified and thus addressed. The process described above is continued until all participants are identified, one by one.

U.S. Pat. No. 7,091,876B2 also describes a second embodiment of a bus-system, identical with the setup of the bus system 10 shown in FIG. 1, whereby the addressing process takes into account that the current flowing on the bus 14 does not exceed a predetermined maximum value. This boundary condition exists, for example, in LIN-bus applications. The initial situation for addressing according to this alternative process is shown again in FIG. 1. All participants 16.*i* feed their quiescent currents. In a first phase, each participant 16.*i* detects the respective current flowing through the bus 14. If this current detected by at least one participant exceeds a predetermined threshold value, this fact is interpreted to the effect that participants not addressed so far are connected behind this participant, when looking at the bus 14 from the control unit 12, such that the said participant and all participants connected to the bus 14 between this participant and the control unit 12 do no longer take part in the further addressing process. It is assumed that, as shown in FIG. 1, the participant 16.2 has detected in the bus 14 a current exceeding a threshold value. Therefore the participants 16.1 and 16.2 do not take part in the subsequent feeding of identifying current, such that identifying currents from the participants 16.3 (not shown) to 16.*n* are fed. The identification within this group of participants feeding identifying currents is then carried out in the manner described above, wherein in the first addressing cycle the participant 16.*n* is identified and an address can be assigned to this participant. During the next identifying cycle the switch 42 of the participant 16.*n* remains open all the time. Again, at the beginning of the next identifying cycle all participants 16.1 to 16.*n*−1 not addressed so far feed their quiescent currents. It should be assumed that during this addressing phase, too, the participant 16.2 detects a current exceeding a threshold value, such that, as has already been described in conjunction with the first addressing cycle, the participants 16.2 and 16.1 do not take part in the further addressing process in the second addressing cycle. The identification and addressing during this second cycle are then carried out in the manner described above and result in identification and/or addressing of the participant 16.*n*−1. The process described above is continued until a situation occurs in which the participant 16.2 does no longer detect a current value exceeding the threshold value while quiescent current is being fed. If this situation occurs for the first time during the addressing process, the participant 16.1, instead of the participant 16.2, detects a current still exceeding the threshold value while all participants feed their quiescent current. The participant 16.2 then takes part in the identifying and addressing cycle like the participants connected to the bus 14 behind the participant 16 when looking at the bus 14 from the control unit 12. The participant 16.1, however, does not take part in this process step.

U.S. Pat. No. 7,091,876B2 also describes a third embodiment of a bus-system, similar to the setup of the bus system 10 shown in FIG. 1, but whereby besides addressable participants, also non-addressable participants are connected to the bus. These devices already have a fixed address, and do not take part in the addressing cycle described above. They can, however, feed a quiescent current into the bus, which is measured first.

A disadvantage of the bus systems described in U.S. Pat. No. 7,091,876B2 is that it is difficult, and sometimes even impossible, to find suitable threshold values for guaranteeing that each slave is assigned exactly one address. This is especially true in an automotive environment, where devices from multiple vendors are used, and where the parameters of the devices may vary considerably (e.g. due to process variations and varying supply voltage), and where the number of devices may change even after production (e.g. during after-sales service).

SUMMARY OF THE INVENTION

It is an object of embodiments of the present invention to provide an improved method for addressing each of the addressable participants of a bus system.

It is in particular an object of embodiments of the present invention to provide a robust method for guaranteed assignment of an address to each and every addressable participant of a bus system, even under variable conditions of supply voltage, number of participants on the bus, etc.

This object is accomplished by a method, and a bus system, and a device according to embodiments of the present invention.

According to a first aspect of the present invention, a method is provided for addressing each of the addressable participants of a bus system, the bus system comprising a control unit, a bus coupled to the control unit, and a plurality of addressable participants connected to the bus, the method comprising:
a) pre-selecting at least a first number N1 of addressable participants, the pre-selection comprising: feeding, by each of the addressable participants not addressed so far, of a pre-selection current, wherein all pre-selection currents flow through the bus towards the control unit; measuring of the pre-selection current flowing through the bus by each of these participants; and pre-selecting those participants that measure a pre-selection current lower than a first threshold T1;
b) selecting from the pre-selected participants a second number of addressable participants, the second number N2 being at least one, the selection comprising: feeding by each of the pre-selected participants of a selection current, wherein all selection currents flow through the bus towards the control unit; measuring by each of the pre-selected participants of the selection current flowing through the bus; selecting the second number of participants based on at least a second threshold T2, different from the first threshold T1;
c) assigning a second number N2 of addresses to each of the participants selected in step b);
d) repeating steps a) to c) without the participants already being addressed, until all addressable participants are addressed; wherein the pre-selection current fed by each addressable participant is generated by a first current source providing a current substantially independent of the supply voltage.

It is an advantage of providing the pre-selection current by a current source in accordance with embodiments of the present invention, rather than by a pull-up resistor as in the prior art, that in this way it can be guaranteed that each addressable slave on the bus is assigned exactly one address, and errors of an address being assigned to two slaves, or an address not being assigned, is avoided. Thus a robust address allocation method is provided.

This is made possible because the tolerance of the current provided by a current source can easily be restricted to narrow margins (e.g. +/−10%), irrespective of the supply voltage, whereas the current provided by pull-up resistors (as used in the prior art) is linearly dependent on the supply voltage, as well as on the common-mode voltage already built-up by the current flowing through the other devices. Due to the high tolerance (e.g. more than +/−50% in practice) of the current provided by the pull-up resistors, the number of pre-selected slave devices is very unpredictable, and may vary substantially, e.g. from 2 to 8 devices. A large number of pre-selected devices (e.g. 8) will subsequently cause a large selection current to flow in the final selection step, which will result in large measurement errors due to the large common-mode voltage. This problem is touched in the prior art, but not solved to satisfaction, and robust address allocation cannot easily be solved by fine-tuning the first threshold value T1 in an attempt to restrict the number of pre-selected devices, because of the large variation, and choosing a too small value of the first threshold may result in that none of the participants is pre-selected.

It is an advantage of embodiments of the present invention that the current provided by the current source has a highly predictable value. This simplifies circuit testing, and allows the master to estimate the number of participants not addressed so far on the bus. The latter may be important in case of so called "group addressing", i.e. when two or more devices are addressed per iteration, especially during the pre-selection of the last iteration when less than N2 devices are left unaddressed, because now the master can with certainty decide to send less than N2 addresses in the last iteration.

It is an advantage of embodiments of the present invention that both the pre-selection current and the selection current are provided by a current source, as this allows the threshold values to be calculated by simple mathematical formulas. In this way fine-tuning of the threshold values (e.g. at the production stage), can be avoided, because they can be determined by design.

It is an advantage that the second threshold is different from the first threshold, as this allows the thresholds to be specifically (e.g. optimally) chosen for different purposes. In particular, the first threshold can be specifically chosen for the pre-selection, and the second threshold can be specifically chosen for the actual selection.

It is noted that the value of N1 is not a design parameter, but follows from the values of the current source, the first threshold, and the maximum error. It will be clear for a person skilled in the art that the value of N1 is preferably as low as possible, but must at least be equal to the value of N2.

In an embodiment of the method according to the present invention, the pre-selection current lies in the range from a first minimum value to a first maximum value; the selection current in each addressable participant is generated by a second current source providing a selection current substantially independent of the supply voltage and lying in the range from a second minimum value I3min to a second maximum value I3max; the pre-selection and the selection current are measured by each addressable participant with a measurement error smaller than a predetermined maximum error Emax, the predetermined maximum error being smaller than half of the second minimum value I3min; the first threshold T1 is larger than the value calculated by the formula ((N2−1)×I2max+Emax); and the selection of at least one participant from the pre-selected participants in step b) occurs by selecting that participant that measures a selection current smaller than a second threshold T2, the second threshold being larger than the predetermined maximum error Emax, and smaller than the value calculated by the formula (I3min−Emax).

By choosing a first and second threshold value T1, T2 as indicated by the formulas above, it is guaranteed that the pre-selection will provide at least N2 devices (except for the last iteration where less than N2 devices may be pre-selected because less than N2 devices remain available for selection), and that the selection will select exactly N2 devices (except for the last iteration). In this way, each addressable participant on the bus is allocated exactly one address.

It is an advantage that the first and second threshold can be expressed in terms of the minimum and/or maximum values of the current sources, and of the accuracy of the measurement circuit. This guarantees proper addressing and allocation to each of the slaves by design, and provides insight in how the various parameters cooperate.

It is noted that in this embodiment only a lower limit for the first threshold is given, which guarantees that at least N2 devices are pre-selected. It is, however, desirable to choose the value of T1 not much higher than the lower limit, because higher values of T1 may cause more devices to be pre-selected, and thus more devices to participate in the final selection step, and thus to increase the common mode voltage, which may increase the measurement error. However, as long as the threshold values for T1 and T2 obey the formulas above, robust addressing is guaranteed.

In an embodiment of the method, the first threshold T1 is smaller than the value calculated by the formula (N2×I2max+Emax).

As mentioned above, it is mandatory to select the value of T1 above a lower limit so as to guarantee that a sufficient number of slaves are pre-selected, however, it is advantageous to pre-select only as few slaves as required for the final selection step. By choosing the first threshold within the upper limit given by the formula above, the number of pre-selected slaves can be reduced, thus the common mode voltage decreased, and thus the measurement error can also be decreased. This may relax the requirements on the measurement circuitry.

In an embodiment of the method, the second number N2 is one. In this embodiment, one address is allocated in a robust way to one addressable participant, per iteration. In other words, the address allocation occurs one-by-one.

In an embodiment of the method, the maximum measurement error Emax is not larger than 0.50 mA; the pre-selection current lies in the range from 0.41 mA to 0.49 mA; the first threshold T1 is larger than 0.50 mA and smaller than 0.99 mA; the selection current lies in the range from 1.85 mA to 2.25 mA; the second threshold T2 is larger than 0.50 mA and smaller than 1.35 mA.

This is a specific example, where the slaves have a first current source generating a current of 0.45 mA+/−10%, and a second current source of 2.05 mA+/−10%. It is an advantage that the value of the second current source is the same as is already used in existing devices. The second threshold value may e.g. be chosen about halfway between the lower and upper limit.

In an embodiment, the second number N2 is at least two; the selection in step b) is further based on a third threshold T3 determined as a value in the range from (1×I3max+Emax) to (2×I3min−Emax), and step b) further comprises the selection of a second participant of the pre-selected participants as that participant that measures a selection current higher than the second threshold T2 and lower than the third threshold T3; and the assigning of the second number N2 of addresses in step c) to each of the two selected participants occurs in a single message comprising at least a first and a second address, the first selected participant accepting the first address and the second selected participant accepting the second address.

In this embodiment, at least two addresses are allocated in a robust way to at least two addressable participants per iteration. In this way, the address allocation can occur two-by-two, or three-by-three, etc. This effectively reduces by a factor of about two or three the time required for allocating the addresses. The advantage thereof should not be underestimated, because "every second counts" in a high-volume production environment, such as in automotive. Of course, this also requires corresponding behaviour of the control unit (master), which has to provide more than one address per iteration.

It is an advantage of using the current source during the pre-selection step, because it allows a guaranteed minimum number of slaves to be pre-selected by choosing a proper value of the first threshold. It is an advantage of using the first current source, that this threshold value can be calculated at design-stage by simple mathematical formulas. It is an advantage that the threshold values are independent of the voltage supply.

In an embodiment, the number N2 is two; the maximum measurement error Emax is not larger than 0.50 mA; the pre-selection current lies in the range from 0.41 mA (I2min) to 0.49 mA (I2max); the first threshold T1 is larger than 0.99 mA and smaller than 1.48 mA; the selection current lies in the range from 1.85 mA (I3min) to 2.25 mA (I3max); the second threshold T2 is larger than 0.50 mA and smaller than 1.35 mA; the third threshold T3 is larger than 2.75 mA and smaller than 3.20 mA.

This is a specific example of a robust two-by-two address allocation method, where the slaves have a first current source generating a current of 0.45 mA+/−10%, and a second current source of 2.05 mA+/−10%.

It is an advantage that the value of the second current source is the same as is already used in existing devices. The second and third threshold values may e.g. be chosen about halfway between their respective lower and upper limits.

In an embodiment of the method, the second number N2 equals at least three; the selection in step b) is further based on a fourth threshold T4 determined as a value in the range from (2×I3max+Emax) to (3×I3min−Emax); and step b) further comprises the selection of a third participant of the group of pre-selected participants as that participant that measures a selection current I3 higher than the third threshold T3 and lower than the fourth threshold T4; and wherein the message further contains a third address, the third selected participant storing the third address.

By allocating the addresses in groups of three devices per iteration, the time required for address allocation can be further reduced. By choosing the threshold values as indicated, robust allocation of one address to each slave, is guaranteed.

In an embodiment of the method, the second number N2 equals three; the maximum measurement error Emax is not larger than 0.50 mA; the pre-selection current lies in the range from 0.41 mA (I2min) to 0.49 mA (I2max); the first threshold T1 is larger than 1.48 mA and smaller than 1.97 mA; the selection current lies in the range from 1.85 mA (I3min) to 2.25 mA (I3max); the second threshold T2 is larger than 0.50 mA and smaller than 1.35 mA; the third threshold T3 is larger than 2.75 mA and smaller than 3.20 mA; the fourth threshold T4 is larger than 5.00 mA and smaller than 5.05 mA.

This is a specific example of a robust three-by-three address allocation method.

In an embodiment of the method, at least one not addressable participant is connected to the bus, which participant feeds a quiescent current into the bus; and each addressable participant not addressed so far measures the quiescent current flowing through the bus prior to feeding the pre-selection current to the bus in step a), and subtracts the measured quiescent current from the measured pre-selection current prior to comparing the pre-selection current to the first threshold in step b); and each pre-selected participant subtracts the measured quiescent current from the measured selection current prior to comparing the selection current to the at least second threshold.

By measuring the quiescent current, and subtracting it from the pre-selection current and the selection current, as indicated, the method described above can be extended to bus-systems having both addressable devices and non-addressable devices. It is an advantage that a robust address allocation is provided to such a bus.

According to a second aspect, the invention provides a bus system comprising a control unit, a bus connected to the control unit, and a plurality of addressable participants connected to the bus, wherein the control unit and the addressable participants are provided for together performing the method described above, and wherein each addressable participant comprises the first current source for providing the pre-selection current substantially independent of the supply voltage.

In an embodiment of the bus system, the second number is at least two; the control unit is adapted for providing at least a first address and a second address in a single message; and the addressable participants are adapted for comparing the measured selection current with at least a second thresholds T2 and a third threshold T3, and for accepting the first address when the measured selection current is smaller than the second threshold T2, and for accepting the second address when the measured selection current is larger than the second threshold T2 and smaller than the third threshold T3.

It is an advantage that such a bus system according to embodiments of the present invention is provided for so called group-addressing, i.e. for allocating at least two addresses per iteration. This reduces the time required for address allocation by a factor of about two or more.

In an embodiment, the bus system further comprises at least one not addressable participant connected to the bus, which participant feeds a quiescent current into the bus; wherein each addressable participant is adapted for measuring the quiescent current flowing through the bus prior to feeding the pre-selection current to the bus, and for subtracting the measured quiescent current from the measured pre-selection current prior to comparing the pre-selection current to the first threshold T1; and wherein each preselected participant is adapted for subtracting the measured quiescent current from the measured selection current prior to comparing the selection current to the at least second threshold T2.

In an embodiment of the bus system, a first end of the bus is connected to a first pin of the control unit, and a second end of the bus opposite the first end, is connected to a second pin of the control unit, different from the first pin, and the control unit is further adapted for addressing the addressable participants connected to the first pin, and thereafter for addressing the addressable participants not addressed so far via the second pin. By connecting the bus in a ring-structure to the master, redundancy is added, and the robustness of the addressing is further improved.

According to a third aspect, the present invention also provides an addressable device as can be used in the bus system described above, the addressable device being adapted for performing at least part of the method described above, the addressable device comprising the first current source for providing the pre-selection current substantially independent of the supply voltage.

It is an advantage that this addressable device according to embodiments of the present invention has a first current source for providing the pre-selection current, because this feature enables the robust address-allocation mechanism described above.

In an embodiment, the addressable device is further adapted for comparing the measured selection current with at least a second thresholds T2 and with a third threshold T3, and for accepting the first address when the measured selection current is smaller than the second threshold T2, and for accepting the second address when the measured selection current I3 is larger than the second threshold T2 and smaller than the third threshold T3.

It is an advantage of such an addressable device that it can be used in a bus applying a two-by-two address allocation in a fast and robust way.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes. Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention, the terms "control unit" and "bus-master" and "master" are used as synonyms.

In the context of the present invention, the terms "bus-participant" and "participant" and "slave" and "device" are used as synonyms.

First, referring to FIGS. 1 to 4, some problems of the prior art bus system will be described. Then, a solution to these problems will be provided by a modified bus system in accordance with embodiments of the present invention, described in relation to FIGS. 5 to 9. Finally FIGS. 7 and 8 will also be used to describe the aspect of "group addressing", made possible by the modified slave of FIG. 5.

FIG. 1 shows the prior art bus system disclosed in U.S. Pat. No. 7,091,876B2, the working of which is described in detail in the prior art section. This known method is based on the ideal assumption that the sensing current is measured with absolute accuracy, and is independent of any common mode voltage. In practice, however, the current(s) can only be measured with a limited accuracy, and the influence of the common mode voltage is not negligible, especially for instance when pull-up resistors are used. Moreover, the prior art method is silent about the value to be used for the pull-up resistor 44, the value of the identification current IA, and especially the threshold values. No hints are provided on how these can be determined, and no numerical examples are given.

Figure 2:
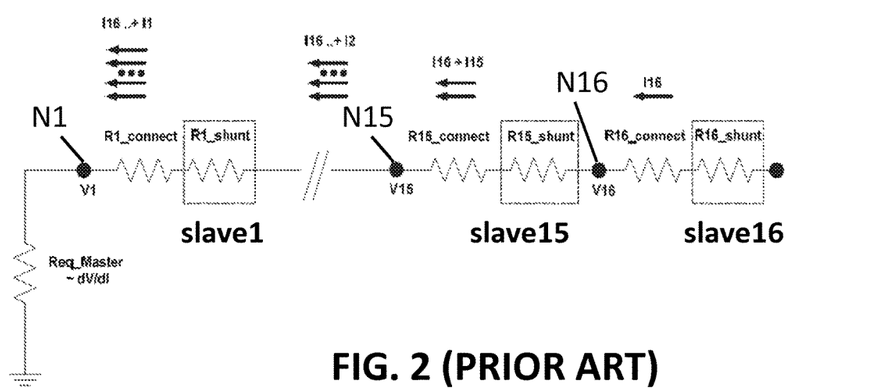
FIG. 2 shows an equivalent electrical diagram of a bus of FIG. 1 with 16 participants.

FIG. 2 shows an equivalent electrical diagram of a simplified bus (e.g. a LIN bus) with 16 participants slave_i (i=1 . . . 16), each having a sense resistor Ri_shunt (corresponding to the shunt resistor 32 of FIG. 1), and a connection resistance Ri_connect representing the resistance of the slave connector and the line resistance (e.g. a copper track on a PCB). A typical value for Ri_shunt and for Ri_connect is 1.0Ω. The master is represented by an equivalent resistance Req_Master, the value of which is proportional to dV/dI. A typical value for this resistance is 20.0Ω. When all slaves Slave1 . . . Slave16 feed a current into the bus (not shown), a current I16, I16+I15, etc, flows through the bus at the nodes N16, N15, etc. towards the master. The goal is to provide a unique address to each of the slaves based on the value of the measured currents. The auto-addressing method described in the prior art teaches that a slave declares itself as the "last slave" if "no current" is detected over its shunt resistor 32, in particular by testing if the measured differential current (IA−I1)<T, IA being the measured identifying current, I1 being a quiescent current, T being a predefined threshold value. Although simple in theory, selecting an appropriate value for this threshold T is not at all trivial in practice. Indeed, if the threshold T is chosen "too small", then the last slave (e.g. slave16 in FIG. 2) may measure an identifying current (IA−I1) which is larger than T, and will falsely assume that it is not the last module, and will not take the address. If the threshold T is chosen "too large", then two slaves (e.g. slave16 and slave15 in FIG. 2) may both measure an identifying current (IA−I1) smaller than T, and may both assume that they are "the last" slave, which is also incorrect. From this description it is clear that the selection of the threshold T is critical, yet no hint nor formula is given in U.S. Pat. No. 7,091,876B2 on how this value should be determined.

Tests have shown that the addressing method according to the first embodiment of U.S. Pat. No. 7,091,876B2 may give problems in a bus system 10 having a relatively large number of slaves (e.g. more than ten), and that choosing an appropriate value for the threshold value T can be quite difficult. The second embodiment of the prior art bus system partly reduces this problem, by doing the selection in two steps: first a pre-selection step where a "small" current is injected (fed by the pull-up resistor 44) into the bus by all participants not addressed so far, followed by the actual selection step where only the pre-selected participants inject a "large" current (fed by the current source 46) into the bus, whereafter the test "(IA−I1)<T" is applied by the pre-selected participants in order to decide which one is the "last" participant on the bus. Although this second embodiment reduces the risk of false addressing, it does not completely eliminate the problem, and there is no hint other than "to take into account that the current flowing on the bus does not exceed a predetermined maximum value". No clue is given on how this can be achieved, without the risk that no slave is pre-selected.

Figure 3:
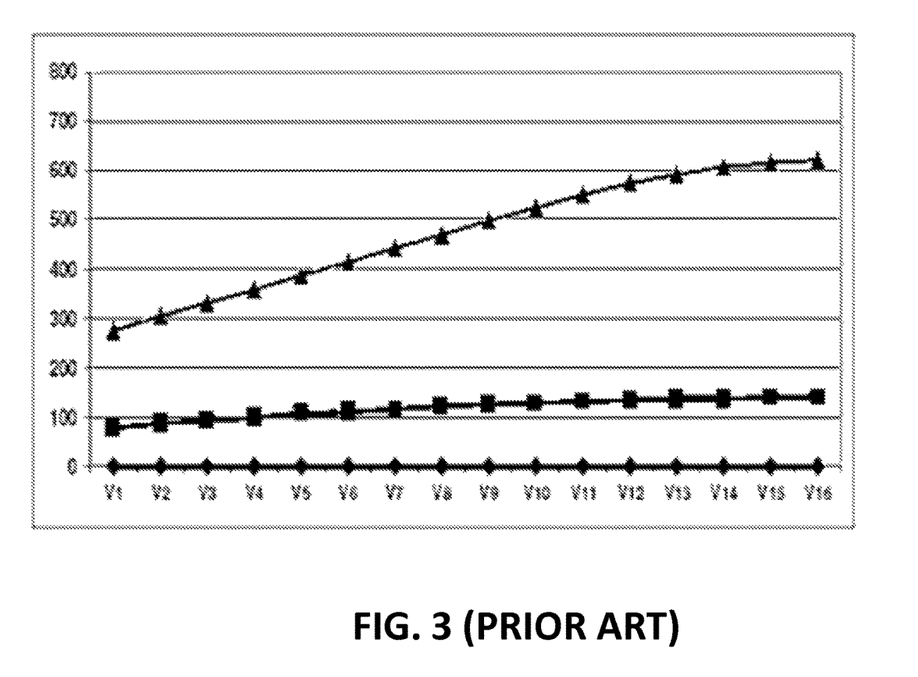
FIG. 3 shows an example of the voltages at the nodes of the different participants during addressing, assuming eight participants being pre-selected.

FIG. 3 shows an example of the voltages V1 . . . V16 measured at the nodes N1 . . . N16 of the slaves shown in FIG. 2, in three phases: a first measurement phase (represented by the diamonds) during which the quiescent current of non-addressable devices attached to the bus is measured. In the example of FIG. 2, it is assumed that the quiescent current I1 equals zero, causing no voltage drop over the nodes N1 . . . N16. In a second step, all addressable slaves not addressed so far (i.e. those which have not yet received an address) feed a "small current" into the bus. In this example, it is assumed that a fixed current of 0.25 mA is fed into the bus by all sixteen slaves. As a result of this second step, a number of slaves (in the example seven slaves) are pre-selected, which will then feed a "large" current into the bus in a third step, in the example 2.30 mA (e.g. 2.05 mA from the current source plus 0.25 mA from the pull-up resistor) into the bus. This causes the voltages V1 . . . V16 to appear at the nodes of the bus, as indicated by the triangles. As can be seen in the graph of FIG. 3, this causes a common mode voltage in the order of 600 mV for the slave farthest away from the master, even when only seven slaves are participating in the last step. In practice, this common mode voltage causes inaccuracies of the current measurements performed in the slaves, on the basis of which each slave has to decide whether it is the "last" device or not. In addition, it is the slave farthest away from the master which has to decide first, that experiences the largest common mode voltage.

Figure 4:
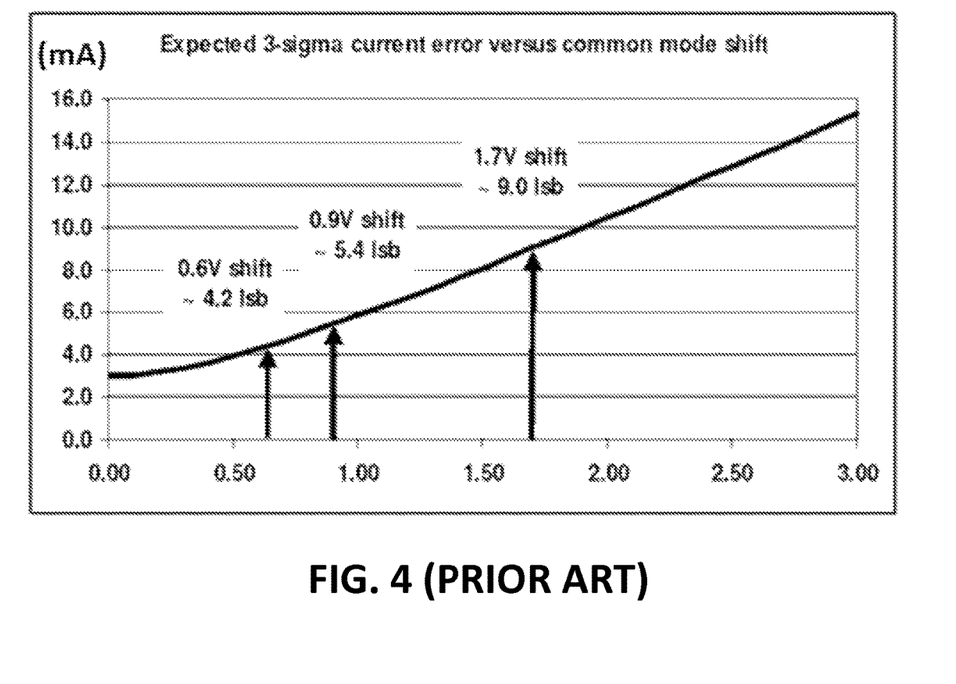
FIG. 4 shows an example of the measurement error in function of the common mode voltage shift.

FIG. 4 shows the estimated 3-sigma current error (in mA) versus common mode shift (in V) in the bus structure of FIG. 2. As illustrated, a common mode shift of about 0.6 V causes a current measurement inaccuracy of about 4.2 lsb (least significant bits), while a 0.9 V common mode shift causes an inaccuracy of about 5.4 lsb, and a 1.7 V common mode shift causes an inaccuracy of about 9.0 lsb. This would lead to the conclusion that the threshold T should be set as low as possible, but as described above, when it is set "too low", then the situation may occur that no slave decides to be the "last" on the bus.

From the above, and taking into account that pull-up resistors 44 in practical devices may assume resistance values from 20 kΩ to 47 kΩ (and even more, e.g. the pull up resistor value tolerance specified in LIN and "airco standardaktuator" specifications are 20 to 60 kΩ, or 30 to 60 kΩ, depending on the version), and that the supply voltage VDD may vary from 9 V to 15 V (or more, e.g. the operational voltage range for flaps in a car is 8 to 16V), thus causing the pre-selection current to range from 0.19 mA to 0.75 mA, it can be appreciated that it is very difficult, or even impossible to determine fixed values for the threshold T, which situation is highly undesirable, especially in high-volume electronics, such as the car industry.

Figure 5:
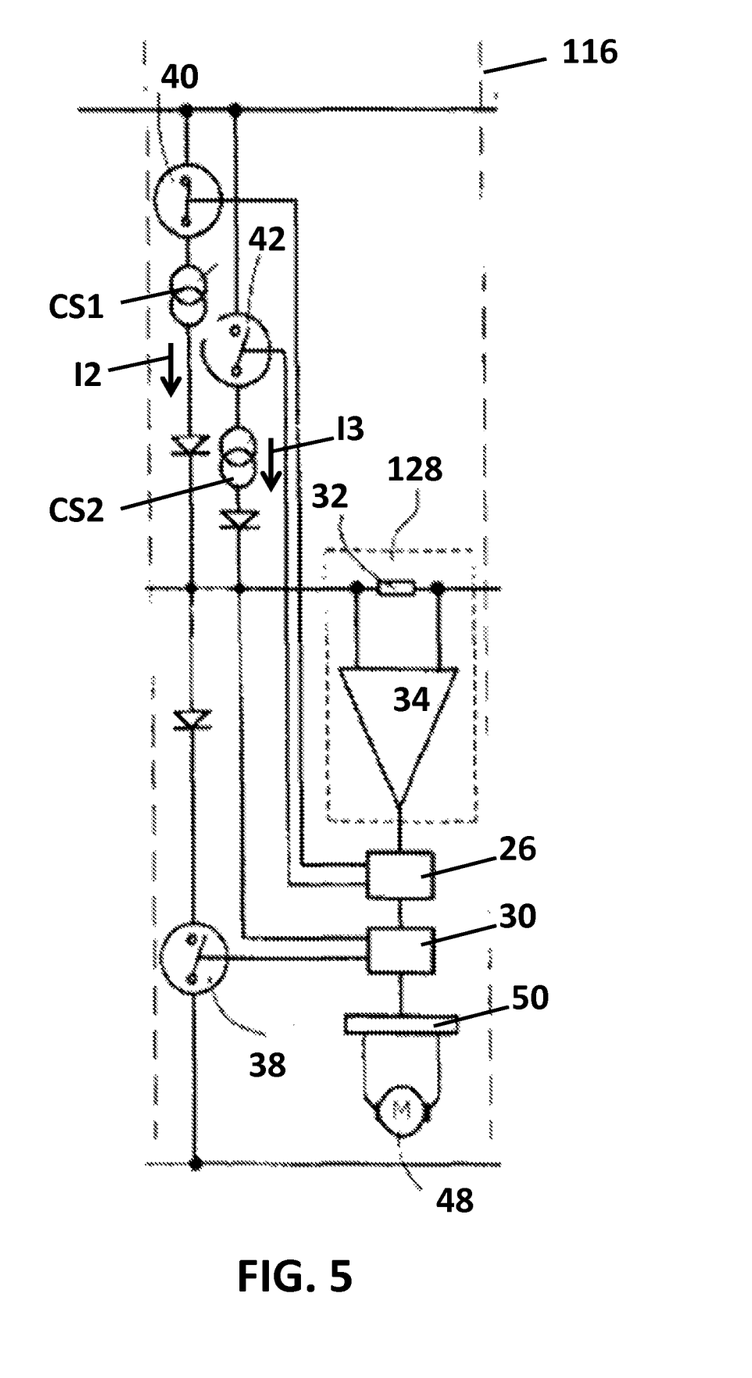
FIG. 5 shows a block diagram of an addressable participant according to aspects of the present invention.

The inventors have found a solution to overcome most of the above mentioned problems, by changing part of the slave circuitry. FIG. 5 shows a block diagram of such an addressable slave device 116. By comparing FIG. 5 and FIG. 1, it can be seen that the key difference is the replacement of the pull-up resistor 44 by a current source CS1, further referred to as the first current source CS1, for providing the pre-selection current I2. For the reader's understanding: reference I1 will be used for the quiescent current of non-addressable devices on the bus. As can be seen, the slave also has a second current source CS2 for providing the selection current I3. The current sources CS1 and CS2 are adapted for providing a predetermined current I2 resp. I3 having predetermined constant values within a tolerance margin of e.g. +/−10% due to process variations, temperature, etc. In a practical implementation, a single programmable current source, e.g. a current source DAC (e.g. having 6 to 8 bits) may be used instead of the two separate current sources CS1, CS2. The current I2 is substantially independent of the supply voltage VDD, in contrast to the current provided by the pull-up resistor 44 provided in the prior art, being connected between a variable supply voltage VDD and a common mode voltage, where the current is linearly depending on the voltage difference between VDD and the common mode voltage, the latter depending a.o. on the number of devices putting a current on the bus, the values of the currents generated by the other devices, the value of the equivalent resistor of the master, etc. Likewise, in accordance with embodiments of the present invention, the second current I3 provided by the second current source CS2 is substantially constant, but a variation of about +/−10% is allowed. Of course, a smaller tolerance for the current sources may also be used, e.g. within +/−8% or within +/−5%. Although the replacement of the pull-up resistor by a current source CS1 may seem as a simple change, it is the key for guaranteeing robust address-allocation, as will be explained below. Apart from the first current source CS1, everything else which has been said for the slaves 16 in the circuit of FIG. 1 is also applicable for the slaves 116 of the present invention, except when explicitly mentioned otherwise.

Figure 6:
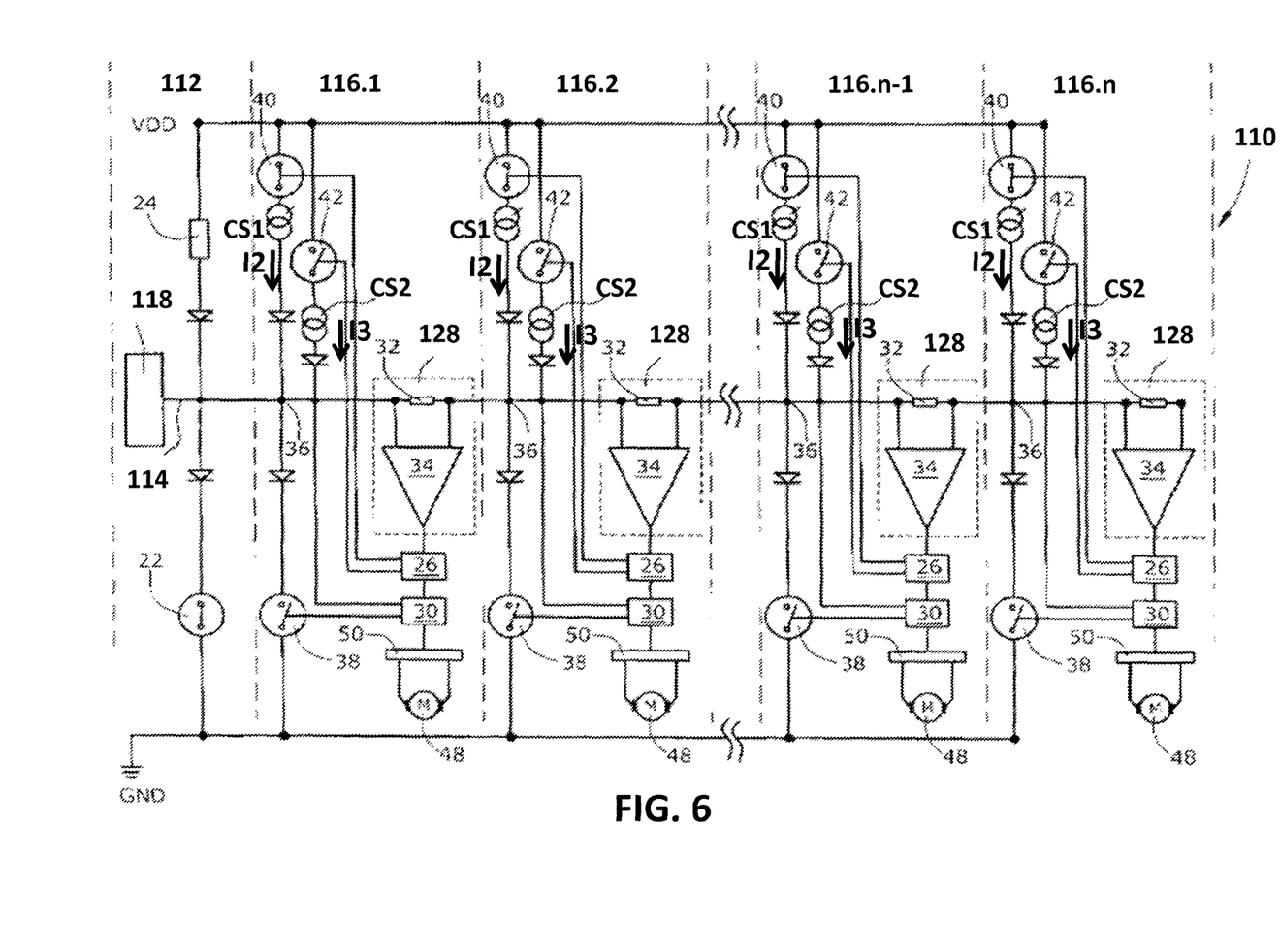
FIG. 6 shows a bus system according to aspects of the present invention, comprising addressable devices according to FIG. 5.

FIG. 6 shows an embodiment of a bus system 110 according to aspects of the present invention. The bus system 110 comprises a control unit 112, a bus 114 starting from the control unit 112, and a plurality of addressable participants 116 connected to the bus 114, wherein the control unit 112 and the addressable participants 116 are provided for together performing an address allocation method as will be described below, and wherein each addressable participant 116 comprises the first current source CS1 for providing the pre-selection current I2 substantially independent of the supply voltage VDD.

In an embodiment of the present invention, the method for addressing the participants 116 of FIG. 6 comprises three steps:

In a first step, the switches 40 and 42 are open, and all addressable slaves 116.i (i=1, . . . , n) measure a quiescent current I1 which may flow through the sense resistor 32, e.g. caused by non-addressable slaves (not shown) connected to the bus 114. The value of the measured current I1 may be stored in a local memory (not shown).

In a second step, all addressable slaves 116.i feed a pre-selection current I2, provided by the first current source CS1, to the bus 114 (e.g. by closing the switch 40 while leaving switch 42 open). At the same time, the current flowing through the sense resistor 32 is measured as a value I2, which may be stored in memory. Then each addressable slave 116.i calculates the difference I2-I1 of the second and the first current, and checks if this value is smaller than a first predetermined threshold T1. (It will be further explained how this threshold can be determined). The slaves for which (I2-I1)<T1 will participate in the third step, the slaves for which (I2-I1)>T1 will not participate in the third step, thus a pre-selection has been made, resulting in a number N1 of slaves.

In a third step, the N1 slaves which were pre-selected in the second step feed a selection current I3 to the bus 114 (e.g. by closing the second switch 42 while leaving the first switch 40 open). The selection current I3 is provided by the second current source CS2. At the same time, the current flowing through the sense resistors 32 is measured as a value I3, which may be stored in memory. Then each of the N1 pre-selected slaves calculates the difference I3-I1 of the third and the first current, and checks if this value is smaller than a second predetermined threshold T2. (It will be further explained how this threshold T2 may be determined). The slave for which (I3-I1)<T2 decides that it is the "last slave", and will accept the address. The address may be sent before the actual selection, or after the actual selection.

In fact, the first step is optional, and may be omitted in a bus system 110 where only addressable slaves 116 are connected to the bus 114. In this variant of the method, the subtractions can be omitted, and the value of I2 is compared to the threshold T1, and the value of I3 is compared to the threshold T2. Alternatively, it may be assumed that I1=0 mA.

In another variant, the bus system 110 is adapted for providing N2 addresses to N2 slaves in each iteration, thus not one-by-one as described above, but e.g. two-by-two, or three-by-three per iteration, each iteration comprising the steps of 1) measuring the quiescent current (this step is optional), 2) performing a pre-selection of N1 slaves, and 3) making the final selection of N2 slaves, and assigning N2 addresses to these slaves. How this can be achieved in a reliable way, will be explained next.

Figure 7:
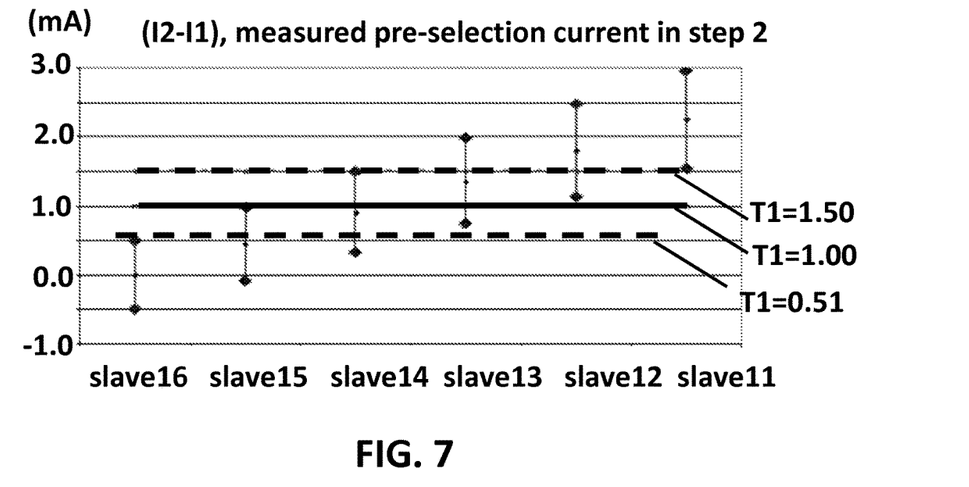
FIG. 7 illustrates the pre-selection current measured by several participants, and shows threshold values relevant for the pre-selection step, in a bus system according to embodiments of the present invention.
Figure 8:
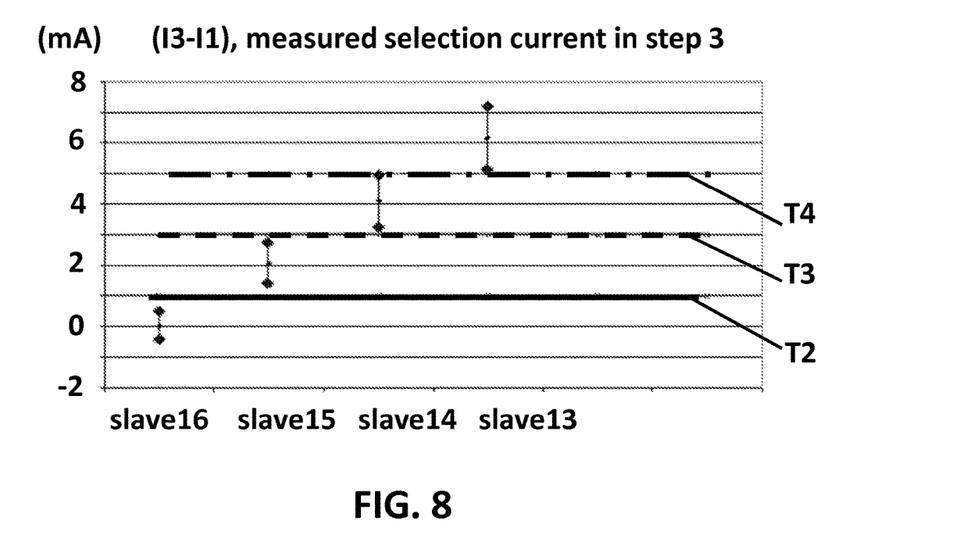
FIG. 8 illustrates the selection current measured by several participants, and shows threshold values relevant for the final selection step, in a bus system according to embodiments of the present invention.

FIG. 7 and FIG. 8 illustrate the pre-selection step and the selection step respectively, in function of the first and the second threshold value T1, T2. The values of the graphs are chosen for a specific example where:

the first current source CS1 provides a current I2 of 0.45 mA+/-10%, further referred to as I2avg+/-10%, or the range from I2min to I2max, whereby I2min is about 0.41 mA, and I2max is about 0.49 mA), and the second current source CS2 provides a current I3 of 2.05 mA+/-10%, further referred to as I3 avg+/-10%, or the range from I3min to I3max, whereby I3min is about 1.85 mA, and I3max is about 2.25 mA, and the current measurement error of the pre-selection current I2 or (I2-I1) and of the selection current I3 or (I3-I1) is smaller than +/-0.50 mA, further referred to as Emax=0.50 mA, but the invention also works for other values of the first current source CS1, and the second current source CS2, and the measurement error Emax. General formulas will be derived further.

The minimum, nominal and maximum values of (I2-I1) as measured by slave16 to slave11 for this example are given in Table 1:

TABLE 1

|         | minimum (mA) | nominal (mA) | maximum (mA) |
|---------|--------------|--------------|--------------|
| slave16 | -0.50        | 0.00         | 0.50         |
| slave15 | -0.09        | 0.45         | 0.99         |
| slave14 | 0.32         | 0.90         | 1.48         |
| slave13 | 0.73         | 1.35         | 1.97         |
| slave12 | 1.14         | 1.80         | 2.46         |
| slave11 | 1.55         | 2.25         | 2.95         |

(e.g. the values for slave15 are calculated as follows: 0.41-0.50; 0.45; 0.49+0.50, the values for slave14 are calculated as follows: 2*0.41-0.50; 2*0.45; 2*0.49+0.50, etc)

The minimum, nominal and maximum values of (I3-I1) as measured by slave16 to slave12 of this example are given in the Table 2:

TABLE 2

|         | minimum (mA) | nominal (mA) | maximum (mA) |
|---------|--------------|--------------|--------------|
| slave16 | -0.50        | 0.00         | 0.50         |
| slave15 | 1.35         | 2.05         | 2.75         |
| slave14 | 3.20         | 4.10         | 5.00         |
| slave13 | 5.05         | 6.15         | 7.25         |
| slave12 | 6.90         | 8.20         | 9.50         |

(e.g. the values for slave15 are calculated as follows: 1.85-0.50; 2.05; 2.25+0.50, the values for slave14 are calculated as follows: 2*1.85-0.50; 2*2.05; 2*2.25+0.50, etc) Three embodiments of a bus-system 110 will be illustrated by means of the FIGS. 7 and 8 and the Tables 1 and 2.

EXAMPLE 1

N2=1

The method will first be illustrated for N2=1, this means a process where one address is allocated to one slave in every iteration.

As shown in FIG. 7, slave16 measures the pre-selection current (I2-I1) as a nominal value of 0 mA (there are no other slaves "on its right"), but due to the measurement error of +/-0.50 mA, the value measured by slave16 lies in the range from -0.50 mA to +0.50 mA. Slave15 measures the pre-selection current (I2-I1) as a nominal value of 0.45 mA (there is one slave on "its right" providing a pre-selection current of 0.45 mA+/-10% to the bus), but due to the tolerance of +/-10% of the pre-selection current and due to the measurement error of +/-0.50 mA, the value measured by slave15 lies in the range from -0.09 mA to 0.99 mA, etc. It is noted that the uncertainty region grows for each slave, as can be seen in FIG. 7.

In order to pre-select at least one slave, the value of T1 must be chosen larger than 0.50 mA, so that at least slave16 will be pre-selected. For example, when T1 is chosen as 0.51 mA (see dotted horizontal line in FIG. 7 with T1=0.51), it can be seen that slave16 is pre-selected with certainty, but possibly also slave15 and slave14 are pre-selected (thus N1=1 to 3 in this example). If T1 is chosen equal to 1.00 mA, then slave16 and slave15 are pre-selected with certainty, but possibly also slave14 and slave13 are pre-selected. It can thus be seen that by choosing proper values for T1, it can be guaranteed that at least one or two slaves are pre-selected, and that higher values of T1 may result in the pre-selection of more slaves.

Referring now to FIG. 8, (where slaves16 to slave13 are shown, only some of which may participate in this last step, as described above), slave16 measures the selection current (I3−I1) as a nominal value of 0 mA (as there are no other slaves "on its right" providing 2.05 mA+/−10% each), but due to the measurement error of +/−0.50 mA the value measured by slave16 lies in the range from −0.50 mA to +0.50 mA. Slave15 measures the selection current (I3−I1) as a nominal value of 2.05 mA (there is one slave on "its right" providing the selection current of 2.05 mA+/−10% to the bus), but due to the tolerance on the selection current I3 of +/−10% and due to the measurement error of +/−0.50 mA, the value measured by slave15 lies in the range from 1.35 mA to 2.75 mA, etc.

By choosing a value of T2 higher than 0.50 mA and lower than 1.34 mA, e.g. T2=1.00 mA, it can be guaranteed that only slave16 will "pass" the selection test: (I3−I1)<T2, and will thus accept the address provided on the bus.

In general, in order to guarantee the pre-selection of at least one slave (N1>0), and the selection of exactly one slave (N2=1), the first threshold T1 should be selected larger than the value Emax, and the second threshold T2 should be larger than Emax and smaller than (1×I3min−Emax).

Since in example 1 only one slave needs to be selected in the selection step illustrated in FIG. 8, it is appreciated that it does not help to pre-select more than one slave in the pre-selection step illustrated in FIG. 7. On the contrary, if more slaves are pre-selected, more slaves will participate in step 3 and will supply their selection current of 2.05 mA+/−10% on the bus, which will increase the common mode voltage as described in relation to FIG. 4, which will increase the measurement error. Thus, although any value of T1 larger than 0.50 mA should work, it is better not to increase the value of T1 too much. In particular, it may be good to choose a value of T1 smaller than 1.00 mA, which is the value for providing with certainty two slaves.

In general, it is good to choose T1 smaller than the value given by the formula: N2×I2max+Emax.

EXAMPLE 2

N2=2

As already indicated in example 1, it is possible to choose a value of T1 for guaranteed pre-selection of at least two slaves (that is slave16 and slave15 in FIG. 7). Indeed, if the value of T1 is chosen larger than 0.99 mA, and preferably smaller than 1.48 mA (which is the value of T1 for guaranteed pre-selection of at least three slaves), e.g. T1=1.00 mA, then it is guaranteed that two slaves (slave16 and slave15) are pre-selected, and optionally also other slaves (slave14 and slave13), the number of which is preferably as small as possible.

In the subsequent selection step, illustrated in FIG. 8, two slaves from these pre-selected two to four slaves can then be selected with certainty, moreover, they can be selected at the same time, by using a second threshold T2 and a third threshold T3.

Indeed, by choosing the second threshold T2 larger than 0.50 mA and smaller than 1.35 mA, e.g. T2=1.0 mA, slave16 can recognize itself as the "last" slave, and by choosing a third threshold T3 larger than 2.75 mA and smaller than 3.20 mA, e.g. T3=3.00 mA, slave15 can recognize itself as the "one but last" slave, so they can each accept a corresponding address provided on the bus.

Thus by pre-selecting at least two slaves, and by selecting exactly two slaves, using appropriate values for T1, T2 and T3, two addresses can be assigned to two slaves per iteration, except in the last iteration, if only one slave would be left to be addressed. This process has the advantage that the addressing speed can be substantially doubled, while it is still guaranteed that each slave will be assigned exactly one address. This may be very important in applications where time is critical or very expensive, e.g. in a production environment.

In general, in order to guarantee the selection of exactly two slaves (N2=2), the first threshold T1 must be larger than (1×I2max+Emax), and preferably smaller than (2×I2max+Emax), and the second threshold T2 must be larger than Emax and smaller than (1×I3min−Emax), and the third threshold T3 must be larger than (1×I3max+Emax) and smaller than (2×I3min−Emax).

Referring back to FIG. 5, a slave 116 for use in such a bus system 110, and being adapted for group-addressing of two slaves at the time, comprises a current source CS1 adapted for providing a predefined pre-selection current I2avg within a tolerance margin of +/−10%, and a second current source CS2 adapted for providing a predefined selection current I3avg within a tolerance margin of +/−10%, and a current sensor 128 adapted for measuring the pre-selection current I2 (or I2−I1) and selection current I3 (or I3−I1) within a tolerance margin of +/−0.50 mA, and is adapted for comparing the measured pre-selection current (I2-I1) to a first threshold T1, and for comparing the measured selection current (I3−I1) to a second threshold T2 and to a third threshold T3, and for accepting either the first or the second address placed on the bus, or ignoring the addresses, depending on the outcome of the comparison tests, as described above (i.e. accept the first address if I3<T2, accept the second address if T2<I3<T3, not accept any address if I3>T3). All other parts of the slave 116 (e.g. the amplifier 34, the control circuit 30, the switch 38, the interface 50, etc, may be identical to the prior art slave 16 shown in FIG. 1.

A master 112 for use in such a bus system 110 should be adapted for providing two addresses in the same message.

Figure 9:
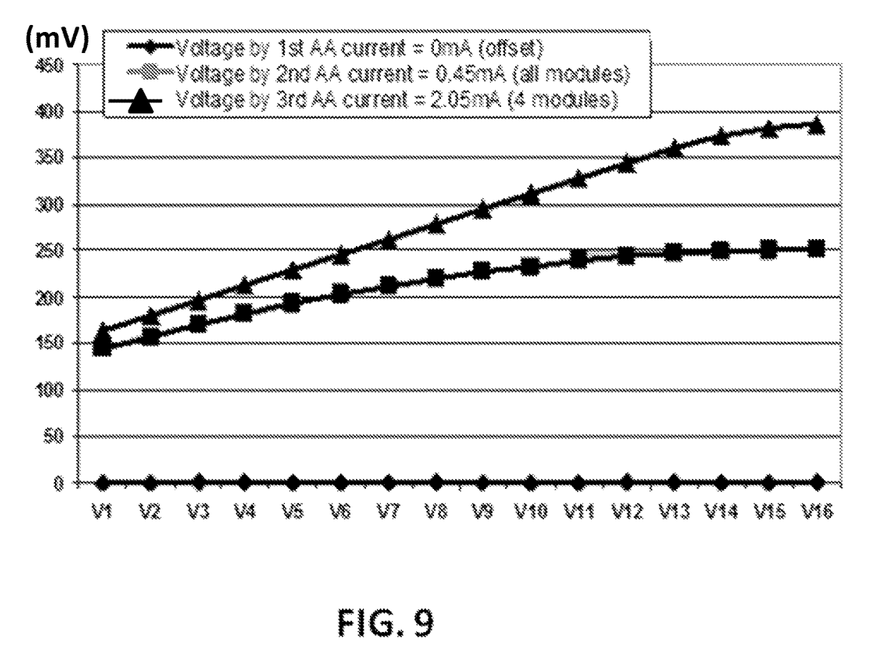
FIG. 9 shows an example of the voltages at the nodes of the different participants (=slaves) during the addressing, measured in a bus-system according to embodiments of the present invention, where the master and the slaves are configured for 2-by-2 addressing, and whereby maximum four slaves are pre-selected.

FIG. 9 shows the common mode voltages for this example during the three steps as described above: the diamonds showing the measurement of the common mode voltages due to the quiescent current I1 (which is assumed to be zero in this example), the squares showing the measurement of the common mode voltages due to the pre-selection currents (I2=0.45 mA) fed by all sixteen slaves, and the triangles showing the measurement of the common mode voltages due to four slaves feeding the selection current (I3=2.05 mA), whereby T1 is chosen larger than 0.99 mA and smaller than 1.14 mA, so that minimum two and maximum four slaves are pre-selected, as can be seen from FIG. 7. If the case that only three or two slaves are pre-selected, the common mode voltages of the squares and the triangles will be even less, thus FIG. 9 shows the worst-case situation. Comparing FIG. 9 with FIG. 3, it can be seen that the common-mode voltage of 600 mV in FIG. 3 is reduced to a maximum of 400 mV in a guaranteed way.

EXAMPLE 3

N2=3

In a similar manner as in Example 2, it is possible to choose a value of T1 for guaranteed pre-selection of at least three slaves (slave16, slave15 and slave14) in FIG. 7 and for guaranteed selection of exactly three slaves (slave16, slave15 and slave14) in FIG. 8. Indeed, referring to the example of FIG. 7, if the value of T1 is chosen larger than 1.48 mA, and preferably smaller than 1.97 mA, e.g. T1=1.50 mA, then it is guaranteed that at least three slaves (slave16, slave15 and slave14) are pre-selected, and possibly also slave13 and/or slave12. Thus the number N1 of pre-selected slaves for T1=1.50 mA is three to five.

Likewise, in FIG. 8 three slaves from these pre-selected slaves can then be finally selected, at the same time, by using a second threshold T2 and a third threshold T3 and a fourth threshold T4.

Indeed, by choosing the second threshold T2 larger than 0.50 mA and smaller than 1.35 mA, e.g. T2=1.0 mA, slave16 can recognize itself as the "last" slave, and by choosing a third threshold T3 larger than 2.75 mA and smaller than 3.20 mA, e.g. T3=3.00 mA, slave15 can recognize itself as the "one but last" slave, and by choosing a fourth threshold T4 larger than 5.00 mA and smaller than 5.05 mA, e.g. T4=5.02 mA, slave14 can recognize itself as the "two but last slave", so that each of the selected slaves can accept a corresponding one of three addresses applied to the bus in a single message. The pre-selected slaves which are not selected (i.e. for which I3>T4) will not accept any of the addresses.

In this way, three addresses can be assigned to three slaves per iteration, except maybe in the last iteration, if only one or two slaves are left to be addressed. This process has the advantage that the addressing speed can be substantially tripled, while it is still guaranteed that each addressable slave 116 on the bus 114 will be assigned exactly one address.

Referring back to FIG. 5, a slave 116 for use in such a bus system 110, and being adapted for group-addressing of three slaves at the time, comprises a current source CS1 adapted for providing a predefined pre-selection current I2avg within a tolerance margin of +/−10%, and second current source CS2 adapted for providing a predefined selection current I3avg within a tolerance margin of +/−10%, and a current sensor 128 adapted for measuring the pre-selection current I2 (or I2−I1) or selection current I3 (or I3−I1) within a tolerance margin of +/−0.50 mA. The slave 116 is adapted for comparing the measured pre-selection current (I2−I1) to a first threshold T1, and for comparing the measured selection current (I3−I1) to a second threshold T2, to a third threshold T3 and to a fourth threshold T4, and for accepting either the first or the second or the third address placed on the bus, or for ignoring all addresses, depending on the outcome of the comparison tests, as described above. All other parts of the slave 116 (e.g. the amplifier 34, the control circuit 30, the switch 38, the interface 50, etc, may be identical to the prior art slave 16 shown in FIG. 1.

A master 112 for use in such a bus system 110 should be adapted for providing three addresses in the same message.

EXAMPLE 4

N2=4

It is noted that the present example (with the values of CS1, CS2 and Emax mentioned above) cannot be extended to four address allocations per message, because it can be seen from Table 2 that the selection current of slave12 (6.90 mA to 9.50 mA) would overlap with that of slave13 (5.05 mA to 7.25 mA), which makes it impossible to find a threshold to differentiate between slave 12 and slave 13. Such insight is not obtained from the prior art. However, other examples, with other values of CS1, CS2 and Emax could lead to four (or even more) address allocations per message.

Although the principles of the present invention are described using particular examples, e.g. with a first current source CS1 of 0.45 mA, and a second current source of 2.05 mA, and sixteen slaves, it is clear for the skilled person that the invention also works for other values, by using the formulas given above. For example, suitable values for the current I2avg generated by the first current source CS1 can be chosen in the range from 0.30 to 0.80 mA (nominal), and corresponding suitable values for the current I3avg generated by the second current source CS2 may be a factor of about 4.50 higher than the first current I2. Thus if CS1 is chosen as 0.30 mA (nominal), then CS2 should be chosen about 1.35 mA (nominal). Other factors in the range from 4.10 to 4.90 may also be used.

Ring Connection:

In another aspect of the present invention, instead of connecting one side of the bus to the master 112, both ends of the bus 114 (e.g. LIN-bus) are connected to the master 112, e.g. the first end to a first pin P1, and the second end to a second pin P2. In this way the slaves can be addressed via two paths. This adds redundancy, and failsafe behaviour in case the bus breaks down between the master and the "first" slave (the one that is closest to pin P1), or between two slaves, or between the master and the "last" slave (the one that is closest to pin P2).

The auto-addressing method of this circuit would use the same principles as cited above with respect to other aspects and embodiments of the present invention, and would do some additional steps: In a first step, the master 112 would address all the slaves connected to the first pin P1, while the pin P2 would be disconnected from the bus (e.g. by means of a first switch). In a second step, the master 112 would address all the slaves not addressed so far, connected to the second pin P2, while the first pin P1 would be disconnected from the bus (e.g. by means of a second switch).

There are two possibilities: If the bus 114 was not broken, all slaves 116 would be addressed in the first step, and thus no additional slaves would be found in the second step. In this case the master can continue (after the auto-addressing) by using only the first pin P1 to address all the devices. However, if the bus 114 was broken e.g. between two slaves, the master 112 would find additional slaves 116 in the second step, because not all slaves were given an address in the first step. In this case the master 112 can address the first subset of slaves via the first pin P1, and the second subset of slaves via the second pin P2.

It is noted that this principle can be used with the prior art bus system of FIG. 1, with the bus system according to embodiments of the present invention (FIG. 6), and even with other bus systems, in particular with the "extra wire daisy chain" (XWDC) as promoted by the company NXP, as an alternative to the bus shunt method (BSM), promoted by the company Elmos.

The invention claimed is:

1. A method for addressing each of the addressable participants of a bus system, the bus system comprising a control unit, a bus coupled to the control unit, and a plurality of addressable participants connected to the bus, the method comprising:

a) pre-selecting at least a first number of addressable participants, the pre-selection comprising:

feeding by each of the addressable participants not addressed so far of a pre-selection current, wherein all pre-selection currents flow through the bus towards the control unit, measuring of the pre-selection current flowing through the bus by each of these participants, and pre-selecting those participants that measure a pre-selection current lower than a first threshold;

b) selecting from the pre-selected participants a second number of addressable participants, the second number being at least one, the selection comprising:

feeding by each of the pre-selected participants of a selection current, wherein all selection currents flow through the bus towards the control unit;

measuring by each of the pre-selected participants of the selection current flowing through the bus;

selecting the second number of participants based on at least a second threshold, different from the first threshold;

c) assigning a second number of addresses to each of the participants selected in step b);

d) repeating steps a) to c) without the participants already being addressed, until all addressable participants are addressed;

wherein the pre-selection current fed by each addressable participant is generated by a first current source providing a current substantially independent of the supply voltage.

2. The method according to claim 1, wherein:
the first threshold is chosen in function of the pre-selection current and in function of the predetermined maximum;
the second threshold is chosen in function of the selection current and in function of the predetermined maximum.

3. The method according to claim 1, wherein:
the pre-selection current lies in the range from a first minimum value to a first maximum value;
the selection current in each addressable participant is generated by a second current source providing a selection current substantially independent of the supply voltage and lying in the range from a second minimum value to a second maximum value;
the pre-selection and the selection current are measured by each addressable participant with a measurement error smaller than a predetermined maximum error, the predetermined maximum error being smaller than half of the second minimum value;
the first threshold is larger than the value calculated by the formula ((N2−1)×I2max+Emax), wherein N2 is the second number of participants, I2max is the first maximum value, and Emax is the predetermined maximum error; and
the selection of at least one participant from the pre-selected participants in step b) occurs by selecting that participant that measures a selection current (I3) smaller than a second threshold, the second threshold being larger than the predetermined maximum error, and smaller than the value calculated by the formula (I3min−Emax), wherein I3min is the second minimum value, and Emax is the predetermined maximum error.

4. The method according to claim 3, wherein the first threshold is smaller than the value calculated by the formula (N2×I2max+Emax), wherein N2 is the second number of participants, I2max is the first maximum value, and Emax is the predetermined maximum error.

5. The method according claim 1, wherein the second number of addressable participants is one.

6. The method according to claim 5, wherein:
the maximum measurement error is not larger than 0.50 mA;
the pre-selection current lies in the range from 0.41 mA to 0.49 mA;
the first threshold is larger than 0.50 mA and smaller than 0.99 mA;
the selection current lies in the range from 1.85 mA to 2.25 mA;
the second threshold is larger than 0.50 mA and smaller than 1.35 mA.

7. The method according to claim 1, wherein:
the second number of addressable participants is at least two;
the selection in step b) is further based on a third threshold determined as a value in the range from (1×I3max+Emax) to (2×I3min−Emax) wherein I3max is a second maximum value, Emax is the predetermined maximum error and I3min is the second minimum value, and step b) further comprises the selection of a second participant of the pre-selected participants as that participant that measures a selection current higher than the second threshold and lower than the third threshold; and
the assigning of the second number of addresses in step c) to each of the two selected participants occurs in a single message comprising at least a first and a second address, the first selected participant accepting the first address and the second selected participant accepting the second address.

8. The method according to claim 7, wherein:
the second number of addressable participants is two;
the maximum measurement error is not larger than 0.50 mA;
the pre-selection current lies in the range from 0.41 mA to 0.49 mA;
the first threshold is larger than 0.99 mA and smaller than 1.48 mA;
the selection current lies in the range from 1.85 mA to 2.25 mA;
the second threshold is larger than 0.50 mA and smaller than 1.35 mA;
the third threshold is larger than 2.75 mA and smaller than 3.20 mA.

9. The method according to claim 7, wherein:
the second number of addressable participants equals at least three;
the selection in step b) is further based on a fourth threshold determined as a value in the range from (2×I3max+Emax) to (3×I3min−Emax), wherein I3max is the second maximum value, Emax is the predetermined maximum error and I3min is the second minimum value; and step b) further comprises the selection of a third participant of the group of pre-selected participants as that participant that measures a selection current higher than the third threshold and lower than the fourth threshold;
and wherein the message further contains a third address, the third selected participant storing the third address.

10. The method according to claim 9, wherein:
the second number of addressable participants equals three;
the maximum measurement error is not larger than 0.50 mA;
the pre-selection current lies in the range from 0.41 mA to 0.49 mA;
the first threshold is larger than 1.48 mA and smaller than 1.97 mA;
the selection current lies in the range from 1.85 mA to 2.25 mA;
the second threshold is larger than 0.50 mA and smaller than 1.35 mA;
the third threshold is larger than 2.75 mA and smaller than 3.20 mA;
the fourth threshold is larger than 5.00 mA and smaller than 5.05 mA.

11. The method according to claim 1, wherein:
at least one not addressable participant is connected to the bus, which participant feeds a quiescent current into the bus; and
each addressable participant not addressed so far measures the quiescent current flowing through the bus prior to feeding the pre-selection current to the bus in step a), and subtracts the measured quiescent current from the measured pre-selection current prior to comparing the pre-selection current to the first threshold in step b); and
each pre-selected participant subtracts the measured quiescent current from the measured selection current prior to comparing the selection current to the at least second threshold.

12. A bus system comprising a control unit, a bus connected to the control unit, and a plurality of addressable participants connected to the bus, wherein the control unit and the addressable participants are provided for together performing the method according to claim 1, and wherein each addressable participant comprises the first current source for providing the pre-selection current substantially independent of the supply voltage.

13. The bus system according to claim 12, wherein:
the second number of addressable participants is at least two;
the control unit is adapted for providing at least a first address and a second address in a single message; and
the addressable participants are adapted for comparing the measured selection current with at least a second thresholds and a third threshold, and for accepting the first address when the measured selection current is smaller than the second threshold, and for accepting the second address when the measured selection current is larger than the second threshold and smaller than the third threshold.

14. The bus system according to claim 12, further comprising at least one not addressable participant connected to the bus, which participant feeds a quiescent current into the bus;
wherein each addressable participant is adapted for measuring the quiescent current flowing through the bus prior to feeding the pre-selection current to the bus, and for subtracting the measured quiescent current from the measured pre-selection current prior to comparing the pre-selection current to the first threshold;
and wherein each pre-selected participant is adapted for subtracting the measured quiescent current from the measured selection current prior to comparing the selection current to the at least second threshold.

15. The bus system according to claim 12, wherein a first end of the bus is connected to a first pin of the control unit, and wherein a second end of the bus opposite the first end, is connected to a second pin of the control unit, and wherein the control unit is further adapted for addressing the addressable participants connected to the first pin, and thereafter for addressing the addressable participants not addressed so far via the second pin.

16. An addressable device as can be used in the bus system according to claim 12, being adapted for performing at least part of the method according to claim 1, the addressable device comprising the first current source for providing the pre-selection current substantially independent of the supply voltage.

17. The addressable device according to claim 16, further adapted for comparing the measured selection current with at least a second thresholds and a third threshold, and for accepting the first address when the measured selection current is smaller than the second threshold, and for accepting the second address when the measured selection current is larger than the second threshold and smaller than the third threshold.

* * * * *